C. N. CAHUSAC.
LOCK FOR AUTOMOBILES.
APPLICATION FILED JAN. 27, 1916.
1,231,125.
Patented June 26, 1917.
2 SHEETS—SHEET 1.
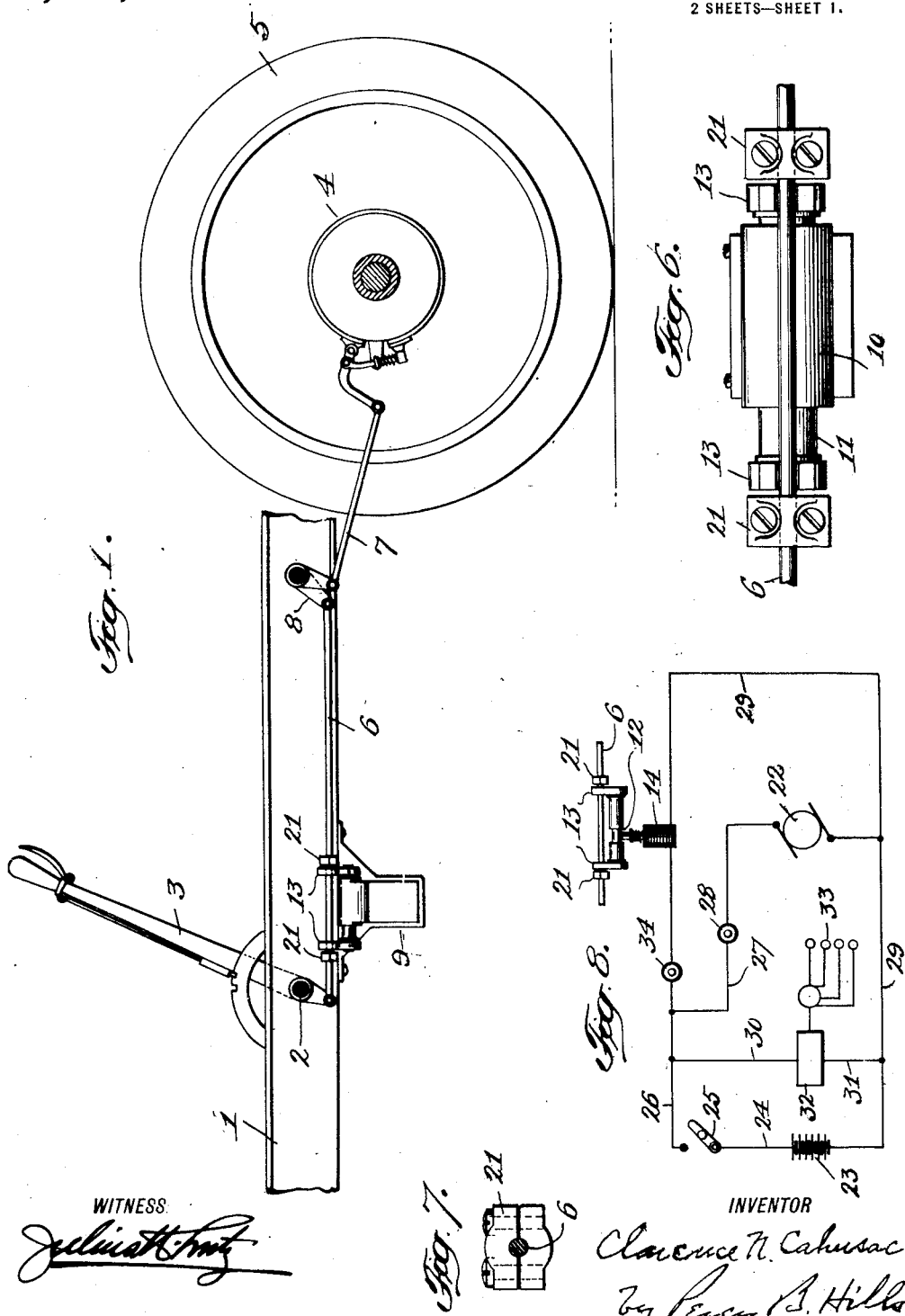
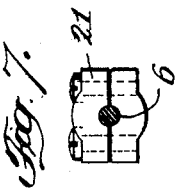
WITNESS
INVENTOR
Clarence N. Cahusac
by Percy B. Hills
ATTORNEY

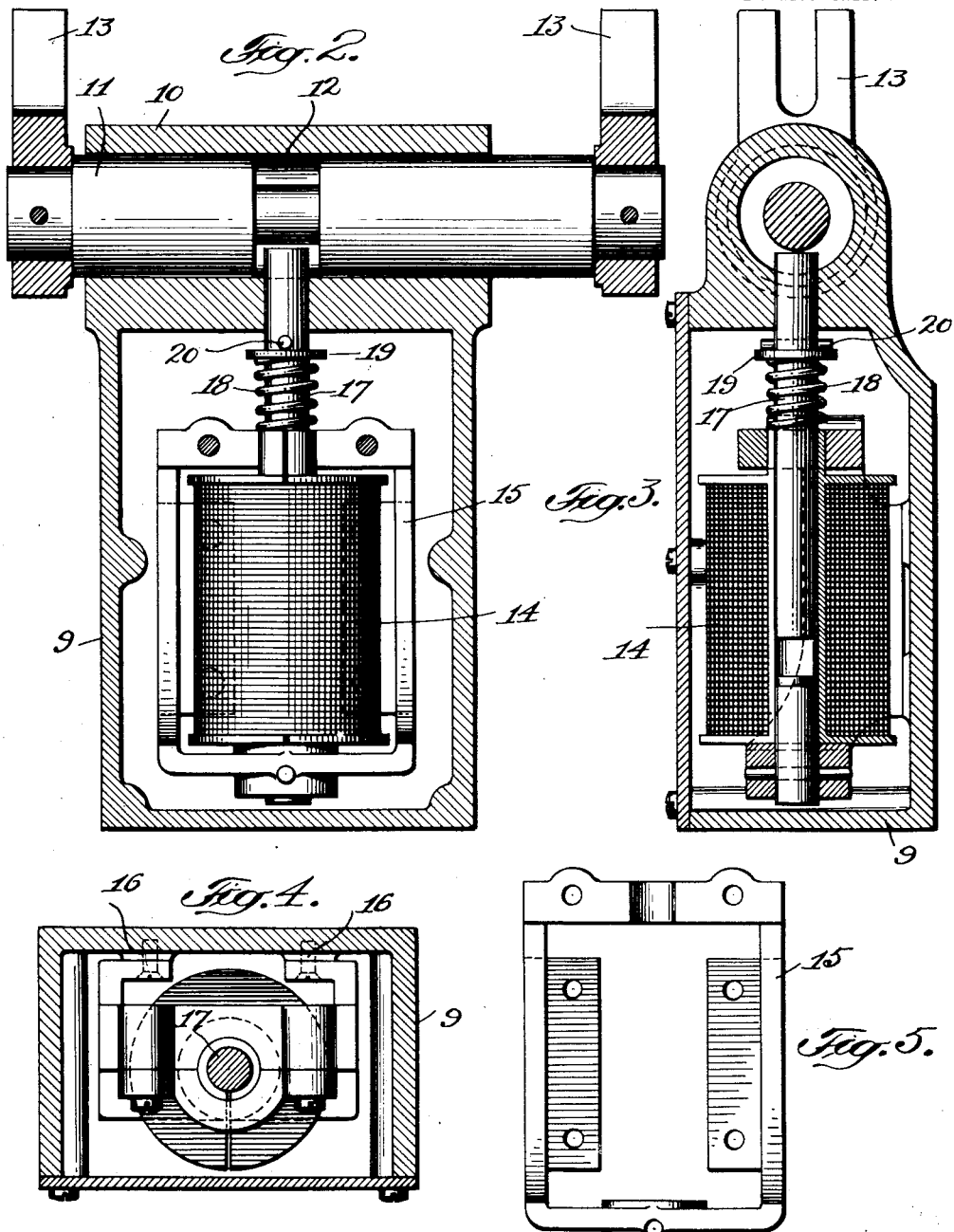

UNITED STATES PATENT OFFICE.

CLARENCE NOEL CAHUSAC, OF JERSEY CITY, NEW JERSEY, ASSIGNOR, BY MESNE ASSIGNMENTS, TO DUPLEX LOCK COMPANY, INC., OF NEW YORK, N. Y., A CORPORATION OF NEW YORK.

LOCK FOR AUTOMOBILES.

1,231,125. Specification of Letters Patent. Patented June 26, 1917.

Application filed January 27, 1916. Serial No. 74,684.

*To all whom it may concern:*

Be it known that I, CLARENCE NOEL CAHUSAC, a subject of the King of Great Britain, residing at Jersey City, in the county of Hudson and State of New Jersey, have invented certain new and useful Improvements in Locks for Automobiles, of which the following is a specification.

My invention relates to devices for locking automobiles against unauthorized use, and has for its object to provide a novel automatic electrically controlled mechanism for accomplishing this result.

This object I accomplish in the manner and by the means hereinafter more specifically described and claimed, reference being had to the accompanying drawings, in which:—

Figure 1 is a side elevation of a portion of the chassis of an automobile and one of the rear wheels, showing the usual emergency brake applied to the rear wheel, and embodying my improved lock.

Fig. 2 is an enlarged vertical sectional view of the casing containing my improved lock mechanism.

Fig. 3 is a sectional view at a right angle to Fig. 2.

Fig. 4 is a horizontal sectional view of the solenoid casing, the solenoid being shown in full lines.

Fig. 5 is a side elevation of the frame or hanger for supporting the solenoid.

Fig. 6 is a top plan view of a portion of the brake connecting rod and my improved lock.

Fig. 7 is a transverse sectional view taken through said connecting rod, showing one of the stop nuts in elevation.

Fig. 8 is a diagrammatic view, illustrating the electrical circuits in connection with a low tension magneto ignition system, including an electric motor for starting.

Similar numerals of reference denote corresponding parts in the several views.

In the said drawings, the reference numeral 1 denotes the chassis of an automobile, having pivoted thereto at 2, the usual lever 3 for controlling the emergency brake, which is in the form of a brake band 4 applied to the hub of the rear wheel 5 in the usual manner. Said brake band is connected with the lower end of the lever 3 by the usual connecting rods 6 and 7, connected through a conventional bell crank 8, and the brake is shown in Fig. 1 applied to the wheel.

Bolted to the underside of the chassis 1 below the connecting rod 6 is a casing 9, in a cylindrical bearing 10 at the upper end of which is disposed a slide bar 11, the latter being grooved annularly intermediate its ends at 12, and having fixed at each end a fork 13, which straddles the connecting rod 6, as best seen in Figs. 1 and 6. Mounted in a chamber in said casing 9 below the bearing 10 is a solenoid 14 supported by a suitable frame or hanger 15 of electro-magnetic material that is bolted to the side of the casing 9 at 16. The solenoid core 17 is normally projected outwardly by a coiled spring 18 thereon, the same engaging between the frame 15 and a collar 19, which latter is retained against longitudinal movement in one direction by a suitable pin 20 passing through the core 17. Said core when in its projected position will abut against the slide bar 11, and if in register with the annular groove 12 therein will project into said groove, thereby locking said slide bar 11 against longitudinal movement in either direction.

Fixed to the connecting rod 6, just outside of the points where the forks 13 straddle said connecting rod, are two stop nuts 21, the same operating, when the slide bar 11 is retained against longitudinal movement by the solenoid core 17, to prevent any longitudinal movement of the connecting rod 6. It will be understood that the position of the annular groove 12 in the slide bar 11 is such that when engaged by the solenoid core 17, the connecting rod 6 must be in a position applying the emergency brake band 4 to the rear wheel hub. It results, therefore, that with the emergency brake so applied, and the slide bar 11 locked by the core 17 against sliding movement, the connecting rod 6 will also be maintained against movement, thereby maintaining the emergency brake applied to the rear wheel and preventing the running of the car.

I prefer to control the operation of the solenoid 14 in the manner illustrated diagrammatically in Fig. 8. This view illustrates the device in use in connection with a low tension magneto ignition circuit, and also illustrates an electric starting motor, the latter being shown at 22. The battery is shown at 23, and the circuit to the starter is from said battery through wire 24, normally closed secret switch 25, hereinafter described, wire 26, wire 27 having a switch button 28 interposed therein, motor 22, and wire 29, back to the battery. Also interposed in said circuit, through wires 30 and 31, is the usual low tension magneto or induction coil 32, for controlling the spark to the cylinders, the view illustrating conventionally spark plugs 33 for a four-cylinder engine. The circuit controlling the solenoid 14 is through wire 24, secret switch 25, wire 26 to the solenoid, and wire 29 back to the battery. Interposed in the wire 26 is a switch button 34 for manually closing the circuit in a manner similar to the switch button 28.

In installing the device, the secret switch 25 is located at a concealed point unknown to the casual person, or it may be disposed in a locked casing where it cannot be operated except by one having access to the same or may be controlled by a key, in the manner that the ignition circuits of many automobiles are controlled. In operation, the secret switch 25 is normally closed, and the switch buttons 28 and 34 are normally open, the circuit thereby being broken, both to the starting motor 22 and to the solenoid 14. When it is desired to operate the motor 22, the switch button 28 is pressed, thereby closing the circuit to the same. Upon application of the emergency brake 4 by the lever 3, the full application of the same will bring the annular groove 12 in the sliding bar 11 in register with the core 17 of the solenoid 14, and said core will be projected into said groove by the tension of the spring 18, thereby locking the connecting rod 6 and the brake band 4 in applied position. To release the brake band, it is only necessary to press the button 34, thereby completing the circuit through solenoid 14 and energizing the same, which will retract the core 17 and permit the brake to be released. To prevent unauthorized use of the car, it is only necessary for the operator, upon coming to rest, to set the emergency brake 4, thereby locking the rear wheels and registering the solenoid core 17 with the groove 12 in the sliding bar 11, thereby locking the connecting rod 6 with the brake in set position, and then open the secret switch. This breaks the circuit to the solenoid at that point and an unauthorized person will find it impossible, without destroying the mechanism, to release the emergency brake.

I have shown in the diagrammatic view in Fig. 8 my improved device applied in connection with a low tension magneto ignition system, but it will be understood that the same is equally applicable in connection with a high tension magneto system, or with a low tension system having no electrical starter, or with a high tension system having no electrical starter.

It will be observed that the casing 9 containing the solenoid 14 and its core 17 is closed at all points except where the core 17 projects into the bearing 10, thereby providing a dust-proof structure. And this is also true of the bearing 10, the same inclosing dust-proof the slide bar 11, as readily will be understood.

Having thus described my invention, what I claim as new and desire to secure by Letters Patent, is:—

1. The combination with an automobile brake, and applying means therefor, of a slide bar adapted to be moved by said brake mechanism in its movement to setting and unsetting position, a solenoid, a core therefor adapted to engage and lock said bar and said brake mechanism when the latter reaches the set position, a normally open circuit adapted to be closed to energize said solenoid, and means for separately breaking said circuit.

2. The combination with an automobile brake, and applying means therefor, of a slide bar adapted to be moved by said brake mechanism in its movement to setting and unsetting position, a casing carried by the automobile in which said slide bar moves, a solenoid mounted in a closed chamber in said casing, a core therefor adapted to lock said slide bar when said brake mechanism is moved to said setting position, and an electric circuit adapted to be closed to energize said solenoid to release said slide bar.

3. The combination with an automobile brake, and applying means therefor, of a slide bar adapted to be moved by said brake mechanism in its movement to setting and unsetting position, a casing carried by the automobile in which said slide bar moves, a solenoid mounted in a closed chamber in said casing, a core therefor adapted to lock said slide bar when said brake mechanism is moved to said setting position, an electric circuit adapted to be closed to energize said solenoid to release said slide bar, and means for separately breaking said circuit.

4. In a locking device of the character described the combination of a rod for a vehicle, a pair of forked plates engaging said rod, a slidable notched bar carrying said plates, means to normally lock the bar in a predetermined position and means to unlock the said bar.

In testimony whereof I hereunto set my hand this 24th day of January, 1916.

CLARENCE NOEL CAHUSAC.